United States Patent
Feist et al.

(10) Patent No.: US 12,277,213 B2
(45) Date of Patent: Apr. 15, 2025

(54) METHOD AND DEVICE FOR SECURELY STARTING UP A CONTAINER INSTANCE

(71) Applicant: Siemens Aktiengesellschaft, Munich (DE)

(72) Inventors: Christian Peter Feist, Munich (DE); Christian Knierim, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 193 days.

(21) Appl. No.: 17/922,194

(22) PCT Filed: Apr. 27, 2021

(86) PCT No.: PCT/EP2021/060939
§ 371 (c)(1),
(2) Date: Oct. 28, 2022

(87) PCT Pub. No.: WO2021/224062
PCT Pub. Date: Nov. 11, 2021

(65) Prior Publication Data
US 2023/0161867 A1     May 25, 2023

(30) Foreign Application Priority Data
May 5, 2020 (EP) ..................... 20172838

(51) Int. Cl.
*G06F 21/32* (2013.01)
*G06F 21/53* (2013.01)

(52) U.S. Cl.
CPC .............. *G06F 21/53* (2013.01); *G06F 21/32* (2013.01); *G06F 2221/033* (2013.01)

(58) Field of Classification Search
CPC ..... G06F 21/53; G06F 21/32; G06F 2221/033
See application file for complete search history.

(56) References Cited

U.S. PATENT DOCUMENTS 10,146,936 B1    12/2018   Khanduja
11,423,140 B1 *   8/2022   Abdulhayoglu ........ G06F 21/53
(Continued)

FOREIGN PATENT DOCUMENTS

CN     108733455 A    11/2018
EP      3557463 A1    10/2019

OTHER PUBLICATIONS

PCT International Search Report and Written Opinion of International Searching Authority mailed Jun. 9, 2021 corresponding to PCT International Application No. PCT/EP2021/060939 filed Apr. 27, 2021.

*Primary Examiner* — Stephen T Gundry
(74) *Attorney, Agent, or Firm* — Schmeiser, Olsen & Watts LLP

(57) ABSTRACT

A method for securely starting up a container instance in one or more execution environments for one or more components of a technical installation, such an execution environment being designed to execute the container instance includes the following method steps:
a) providing a configurable check function that is performed before and/or while starting up the container instance,
b) logging each step for preparing at least one execution limitation required for starting up and/or executing the container instance,
c) checking each logged step using at least one permissibility criterion configured in the check function, and
d) completing the startup and if necessary the execution of the container instance if the at least one permissibility criterion is satisfied, or
e) initiating an alerting measure or a measure that counteracts the startup if at least one of the possible permissibility criteria is not satisfied.

10 Claims, 1 Drawing Sheet

(56) References Cited

U.S. PATENT DOCUMENTS

| | | | | |
|---|---|---|---|---|
| 11,573,814 B1* | 2/2023 | Aithal | ................... | G06F 16/188 |
| 11,734,418 B1* | 8/2023 | Epstein | ................... | G06F 21/53 |
| | | | | 726/22 |
| 11,775,331 B1* | 10/2023 | Wilkinson | ............ | G06F 9/4881 |
| | | | | 718/1 |
| 11,941,426 B1* | 3/2024 | Melkild | ................ | H04L 41/069 |
| 2011/0202313 A1* | 8/2011 | Wilson | .................... | G06F 21/54 |
| | | | | 702/182 |
| 2016/0274928 A1* | 9/2016 | Linton | ................ | G06F 9/45558 |
| 2020/0389416 A1* | 12/2020 | Sharifi Mehr | .......... | H04L 41/40 |
| 2021/0334377 A1* | 10/2021 | Drori | ....................... | G06F 21/44 |
| 2022/0197689 A1* | 6/2022 | Hotinger | ............. | G06F 9/45558 |
| 2022/0215088 A1* | 7/2022 | Kosaka | ................... | G06F 9/455 |
| 2022/0237007 A1* | 7/2022 | Bleve | ...................... | G06F 9/545 |
| 2022/0382874 A1* | 12/2022 | Kumar | .................... | G06F 21/44 |
| 2022/0391238 A1* | 12/2022 | Wagner | ............... | G06F 9/45545 |
| 2022/0413936 A1* | 12/2022 | Elliott | ................. | G06F 9/45558 |
| 2023/0006988 A1* | 1/2023 | Menth | ..................... | H04L 63/20 |
| 2023/0090689 A1* | 3/2023 | Knierim | ................. | G06F 21/53 |
| 2023/0252163 A1* | 8/2023 | Stopel | ................... | G06F 21/577 |
| | | | | 726/23 |
| 2023/0289176 A1* | 9/2023 | Myers | ................. | G06F 9/45558 |
| 2023/0325492 A1* | 10/2023 | Michalevsky | .......... | G06F 21/53 |
| | | | | 726/26 |
| 2023/0412628 A1* | 12/2023 | Huang | .................... | H04L 43/20 |
| 2024/0111659 A1* | 4/2024 | Reisinger | ............. | G06F 9/4843 |

* cited by examiner

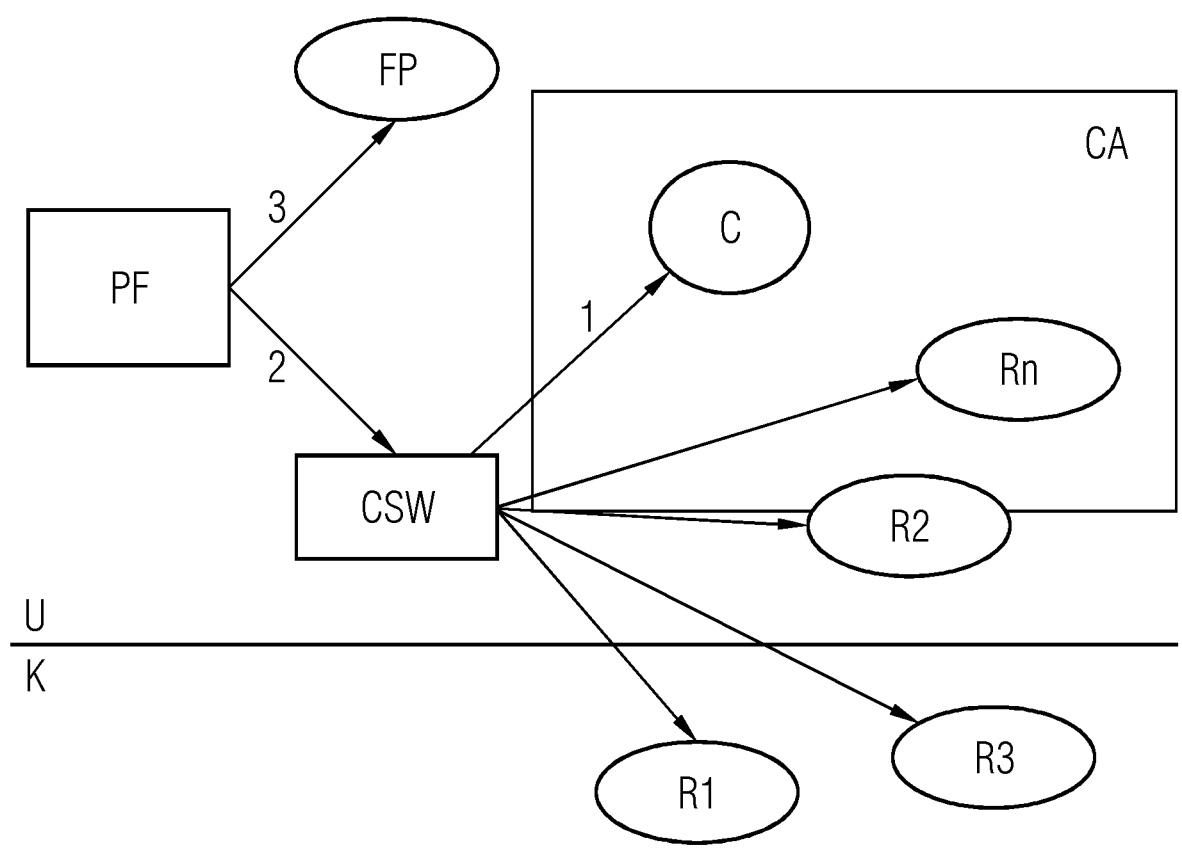

METHOD AND DEVICE FOR SECURELY STARTING UP A CONTAINER INSTANCE

CROSS-REFERENCE TO RELATED APPLICATIONS

This application claims priority to PCT Application No. PCT/EP2021/060939, having a filing date of Apr. 27, 2021, which claims priority to EP Application No. 20172838.3, having a filing date of May 5, 2020, the entire contents both of which are hereby incorporated by reference.

FIELD OF TECHNOLOGY

The following relates to a method and a device for securely starting up a container instance in one or more execution environments for one or more components, which may be an electronic apparatus, a device, a machine, etc., in a technical installation, and an associated computer program product.

BACKGROUND

Since industrial systems (control units, industrial PCs, IoT and edge devices, cloud servers) are often used in the field over a long period, they are at the mercy of constantly changing prerequisites and a dynamic setting. To cope with these circumstances, in particular new devices are developed in such a way that they are able to be flexibly adapted over the period of use, e.g. by supporting reloadable applications by means of container technologies.

Container technologies (e.g. Docker, runC, CoreOS rkt or LXC) are frequently used in association with dynamically reloadable applications in Linux-based systems. The runtime environment for container applications (container apps) is produced by virtualizing global resources (e.g. base file system, network interfaces of the device).

Containers ensure the separation and management of the resources used on a computer. A container image is a map of a container. The image itself may consist of multiple layers based on one another that are protected (cryptographically, memory-protected, etc.) and therefore cannot be altered. The layers are together able to form the file system of a container instance. An image is normally portable, may be stored in repositories (also called container registry) and may be shared with other users. Multiple container instances are able to be started from one image, i.e. an active "instance" of a container image is thus being executed, i.e. a specific application is operated within a container instance.

Runtime environment may be understood to mean for example a device or an apparatus that is designed in such a way as to execute a program code. To this end, the device or the apparatus may have for example a processor unit (CPU) that executes the program code. The runtime environment may itself be realized in software or in hardware. The runtime environment makes it possible to execute program code. A runtime environment may be described by at least one environment-specific parameter, e.g. the machine type/CPU type, version of the host operating system kernel, Linux distribution, installed packages, other running processes, etc.

In the present context, program code may be understood to mean an application (app) and/or a program and/or program instructions and/or a container image. Linux containers, e.g. using Docker or runC, make it possible for example to execute a container memory map (container image) and the software application contained therein in an isolated execution environment that is able to be set up on a runtime environment of the type described above. Container instances may be used for example in order to perform flexibly different (app) functionalities on a control unit, or field device. A container instance, or the container image, is therefore also referred to as a container app.

If a container instance is required to be started, or started up, a check should be performed to ascertain that the execution environments' execution limitation required for a container instance, also called restrictions (e.g. access authorizations, storage limits, license keys, and so on), is also actually implemented. In addition, there is no guarantee that a container instance in the IoT (Internet of Things) setting runs on the terminal (type) provided therefor. This leads to there being the risk, when a container instance is started, that container software allocates too many rights, or too few execution limitations, also called restrictions (e.g. access authorizations, storage limits, license keys, and so on), to the execution environment.

For virtualization methods such as containers, it is particularly critical that different container instances executed in isolation share the same operating system kernel. For use in a security-critical setting, there is therefore a need for improved monitoring, in particular when starting a container instance.

The patent application EP3557463 A1 discloses a method and an execution environment for executing program code on a field device.

This involves using check functions to check the permissibility of individual security-critical operations on the basis of execution requirements when starting/executing a container.

SUMMARY

An aspect relates to configuring a method and a device in such a way that even more secure startup, compared to the prior art, of a container instance in one or more execution environments is ensured.

Embodiments of the invention relate to a method for securely starting up a container instance in one or more execution environments for one or more components of a technical installation, such an execution environment being designed to execute the container instance, characterized by the following method steps:

a) providing a configurable check function that is performed before and/or while starting up the container instance, b) logging each step for preparing at least one execution limitation required for starting up and/or executing the container instance, c) checking each logged step using at least one permissibility criterion configured in the check function, and d) completing the startup and if necessary the execution of the container instance if the at least one permissibility criterion is satisfied, or e) initiating an alerting measure or a measure that counteracts the startup if at least one of the possible permissibility criteria is not satisfied.

The multiple execution environments may run in distributed fashion, or in parallel, on different electronic apparatuses such as computers, devices or machines that may be components of a technical installation, e.g. a factory, or other automation installations.

The steps may also be in the form of phases, or stages, for preparing the required execution limitation or multiple execution limitations.

Container instances are normally started, or started up, in multiple steps. Before the container instance is started, container software, e.g. Docker, provides a container-oriented execution environment for the container instance, which stops and/or starts the container instances, loads the container images and provides resources for the container instances. Said execution environment is also visible by way of an appropriate container instance process, which also starts the container init process and therefore the container instance itself. Execution limitations of the execution environment (e.g. allocating SELinux contexts, discarding capabilities, establishing namespaces, and so on) therefore need to be set up in this container execution environment process or transferred for starting. Compliance checks, i.e. checking on the basis of permissibility criteria, for the execution environment also need to take place when this process starts. The compliance of the execution environment for an instance may be checked by a configurable check function by logging each execution limitation (e.g. SELinux context) to be checked and possibly also all security-critical operations and defined environment parameters (e.g. machine type or license key) that are part of the preparing, or the preparation steps, of the execution environment of a container instance. The check function may be performed externally or by the container instance itself.

A permissibility criterion may be a rights signature (e.g. fingerprint) to be accomplished. There is also the possibility of multiple rights signatures, depending on the type of an execution environment.

A respective hash value may be determined and logged for each execution limitation.

All the determined hash values may be combined with one another in each such step to form a total value, and the total value and the change therein that arises with each step may be logged.

By way of example, a hash value may be formed from a file of the log in a first step. Each file change may result in a subsequent step comprising the hash value being formed in this way by virtue of the previously formed hash value being concatenated with the hash value of the changed file and then hashed. This may also be referred to as a running hash value. In the case of a hex addition, each step results in a further value being added to the sum of the values. The type of combination (e.g. running hash value) of all the hash values with one another may result in a sequence of the aforementioned steps for preparing the at least one execution limitation.

The total value may be representable or may be represented by a fingerprint.

The total value may be compared with the corresponding configured permissibility criterion. It is accordingly ascertained whether the permissibility criterion is satisfied.

Besides the at least one execution limitation, one or more environment parameters of the execution environment may also be logged and may be concurrently taken into consideration when forming the total value. This enables the container instance to be started up on different execution environments (e.g. test environment and productive environment)—as already mentioned above.

Steps c) to e) may be repeated as required (on demand through user interaction), on an event-controlled basis (in event-based fashion) and/or on a time-controlled basis (cyclically at intervals of time) while executing the container instance.

A measure that counteracts the startup may be the following:
if the container init process is prevented from starting,
a switching signal is set, or
e.g. the device state is changed.

An alerting measure may be if the event is also logged and an alarm message or signal is output. The reaction, or measure, may also be different depending on the container image or image origin. If a container instance detects for example that its runtime environment has not been prepared as expected, it may e.g. refuse execution.

Embodiments of the invention therefore allow better and more flexible protection of the devices against harmful use by an attacker. This may contribute to an improvement in the security and sustainability of products. Additionally, this method may prevent container instances from being operated on terminals (e.g. missing license for the container instance), or execution environments, that are not intended for them.

In general, the logging makes it easier to check changes in the execution environment of container instances (e.g. for user-space monitoring processes, or monitoring in a superordinate system such as Aqua-Sec et al.).

Analogously to the above method, a further aspect of embodiments of the invention is a device for securely starting up a container instance in one or more execution environments for one or more components of a technical installation, such an execution environment being designed to execute the container instance, characterized by:
a) a checking unit having a configurable check function and designed to perform the check function before and/or while starting up the container instance,
b) a logging unit designed to log each step for preparing at least one execution limitation required for starting up and/or executing the container instance,
c) wherein the checking unit compares each logged step with a permissibility criterion configured in the check function, and
d) a startup unit designed to complete the startup and if necessary the execution of the container instance if the at least one permissibility criterion is satisfied, or
e) to initiate an alerting measure or a measure that counteracts the startup if at least one of the possible permissibility criteria is not satisfied.

The device may have at least one internally integrated or an externally linked memory in which the checking unit is arranged, or in which the check function is stored as a checking unit.

In addition, is a computer program product (non-transitory computer readable storage medium having instructions, which when executed by a processor, perform actions) comprising a nonvolatile storage medium on which a loadable and executable program code is stored that performs the method according to one of the aforementioned embodiments in a processor unit in particular of a device according to one of the embodiments described hereinabove.

Additionally, a variant of the computer program product having program instructions for configuring a creating device, for example a 3D printer, a computer system or a manufacturing machine suitable for creating processors and/or devices is provided, wherein the creating device is configured using the program instructions in such a way that the execution environment may be created.

Furthermore, a providing device for storing and/or providing the computer program product is provided. The providing device is for example a data carrier that stores and/or provides the computer program product. Alternatively and/or additionally, the providing device is for example a network service, a computer system, a server system, in particular a distributed computer system, a cloud-based computer system and/or virtual computer system that stores and/or provides the computer program product in the form of a data stream.

This provision is effected, by way of example, as a download in the form of a program data block and/or instruction data block as a file, in particular as a download file, or as a data stream, in particular as a download data stream, of the complete computer program product. This provision may, by way of example, alternatively be effected as a partial download that consists of multiple parts and, in particular, is downloaded via a peer-to-peer network or provided as a data stream. Such a computer program product is read into a system by using the providing device in the form of the data carrier, for example, and executes the program instructions so that the method according to embodiments of the invention is carried out on a computer or configures the creating device in such a way that it is able to create the execution environment.

The method, the arrangements, apparatuses, units, or devices, modules and computer program (products) may be designed in accordance with the developments/embodiments of the aforementioned digital circuit arrangement and the developments/embodiments thereof, and vice versa.

One embodiment of the invention provides for a unit, or component, in particular a communication unit, or network component, to be in the form of a hardware component. A unit, or component, may comprise a processor. Subunits of a larger unit, or hardware component, may be implemented in software, firmware, or again in hardware.

A processor, or processor unit, may, in particular, be a main processor (central processing unit, CPU), a microprocessor or a microcontroller, for example an application-specific integrated circuit or a digital signal processor, possibly in combination with a storage unit for storing program instructions, etc. A processor may for example also be an IC (integrated circuit) or a multichip module, in particular an FPGA (field programmable gate array) or an ASIC (application-specific integrated circuit), an SoC (system on chip), a graphics processor GPU (graphics processing unit), a processor for evaluating a neural network such as for example a TPU (tensor processing unit) or a DSP (digital signal processor). The processor may have one or more computing cores (multicore). A processor may also be understood to mean a virtualized processor or a soft CPU. By way of example, it may also be a programmable processor that is equipped with configuration steps for carrying out said method according to embodiments of the invention or is configured using configuration steps in such a way that the programmable processor implements the inventive features of the method or of other aspects and subaspects of embodiments of the invention. The processor may have tamper protection for protecting against physical manipulations, e.g. tamper sensors for detecting physical attacks.

BRIEF DESCRIPTION

Some of the embodiments will be described in detail, with reference to the following figures, wherein like designations denote like members, wherein:

The figure shows an illustrative embodiment of a component of a technical installation.

DETAILED DESCRIPTION

The figure shows an illustrative arrangement of a component having an interface between the operating system K (also called the kernel space) and the user environment U (also called the user space). Resources R1 and R3, e.g. processor units, on the operating-system side and resources R2, e.g. a network interface or peripheral device interface, or Rn, e.g. a memory, on the user-environment side are shown. It is possible for the container instance C to form a container-oriented execution environment CA with the resources R2 and Rn, inter alia, as indicated by the box. Container instances are started up, or started, in multiple steps. Container software CSW, e.g. Docker, starts a container instance C in the example (see step labelled 1).

A logging unit, which may comprise a check function denoted by PF in the figure together with a checking unit in a memory on the user-environment side, is able to log the steps to start the container instance C (see step denoted by 2) and can check them for compliance, or permissibility (see step denoted by 3). In particular preparing the execution limitations (capabilities, namespaces, MAC domain), but e.g. also the command executed in the container (e.g. including the transferred command line arguments) or the existence of information about the execution environment (machine type, any other environment-specific parameters), may be part of the logged steps. It is therefore possible to check the starting process of a container instance.

Before the container instance C is started, the container software provides a container-oriented execution environment for the container instance. Said execution environment is also visible by way of an appropriate container instance process, which also starts the container init process and therefore the container instance itself. Execution limitations of the container execution environment (e.g. allocating SELinux contexts, dropping capabilities, establishing namespaces, and so on) therefore need to be implemented in this container execution environment process or transferred for starting. Compliance checks for the execution environment also need to take place when this process starts.

The compliance of the execution environment for an instance C may be checked by initially determining a unique value (e.g. cryptographic hash) for each execution limitation (e.g. SELinux context) to be checked and combining all values for all the properties to be checked with one another to form a total value (e.g. by way of hex addition, running hash value, etc.). This total value determined for all the properties may therefore form a "rights signature" (fingerprint) FP, which represents the execution limitations of the execution environment of a dedicated container image.

This signature FP is stored with the image and also needs to be retrievable and checkable by anyone who has access to the image. Moreover, this value may be stored as part of a signed container image. So that different execution environments are able to be taken into consideration for the same container image, it is conceivable for multiple different rights signatures to be provided for a single container image. As such, a container instance may be provided with e.g. a first, very restrictive set of rights in a productive environment and with a less restricted set of rights in a development environment.

If a container image is supposed to be executed on an execution environment and the execution limitations, or restrictions, are supposed to be checked, a check function PF checks the container instance C for permissibility, or compliance, at runtime. This may be for example a dedicated process of the operating system, such as e.g. an HIDS process, or the container service used for setting up the container (e.g. Docker Daemon). A dedicated part of the operating system kernel is able to provide the determined rights signature FP by way of an appropriate interface (e.g. system call, sysfs entry). By means of eBPF (extended Berkeley Packet Filter) or an appropriate kernel module (part of the operating system core), the check function is then able to use the rights signature FP determined above to monitor which container images are supposed to be started on the system and how the execution environment has been set up, or restricted, for this container instance. This is accomplished—as described above—by determining, recording and providing a unique total value for each rights allocation/limitation. The check function recognizes that the provision of the execution environment of the container instance is complete as soon as the container init process is supposed to be started. As soon as this init process is supposed to be executed, the check function checks whether the rights signature FP determined at runtime matches the expected and possibly configured rights signature as a permissibility criterion and is therefore permissible. If it is permissible, a startup unit, for example the container software CSW, starts the container instance and permits completion of the execution of the container instance. If it is not permissible, one measure is for example that the container init process is prevented from starting.

In one embodiment, a container instance itself is able to check whether it has been started correctly. Container instances may thus e.g. also check whether other container instances with which they interchange data, for example, have been started properly or also run on the execution environment provided for them. Furthermore, the setup of the execution environment of started container instances may also be recorded in so-called platform configuration registers (PCRs) as part of a measured-boot process using a TPM (trusted platform module). The value recorded in said registers may be provided as part of a remote attestation process. As such, e.g. devices on which only permissible execution environments have been set up may be allowed to access a remote service.

If the determined rights signature FP is recognized as diverging from the expected rights signature, it is possible to react with different measures. Besides the above-described embodiment in which the container init process is prevented from starting, the event may also be logged, a switching signal may be set, or e.g. the device state may be changed. The measure may also turn out differently, e.g. be purely alerting, depending on the container image or image origin. If a container instance recognizes for example that its execution environment has not been prepared as expected, i.e. is impermissible, it may e.g. refuse execution, or take one of the above measures.

Besides the execution limitations, the runtime environments (e.g. existing devices, hardware, host, kernel versions, configuration of security-critical environment parameters (e.g. sysctls, etc.)) may also be concurrently taken into consideration when forming, or determining, the rights signature FP.

Moreover, the sequence for preparing the execution environment and/or the runtime environment may be taken into consideration. Said sequence is obtained for example when determining the running hash value.

It is also possible to check at a later time (cyclically, or before access to a service (remotely or in the operating system itself=on an event-controlled basis) is allowed) whether a container instance has been started permissibly.

Later changes to the execution environment may be used to continue the fingerprint even after the container has started (as such, the mechanism could be used to detect changes at a later time).

The fingerprint may e.g. also be used by the operating system to stop the execution of the container instance, or to permit said execution only to a restricted degree (e.g. no network access).

Although embodiments of the invention has been illustrated and described more thoroughly in detail by way of the exemplary embodiment, embodiments of the invention are not restricted by the disclosed examples, and other variations may be derived therefrom by a person skilled in the art without departing from the scope of protection of embodiments of the invention.

The processes or method sequences described hereinabove may be implemented on the basis of instructions that are available on computer-readable storage media or in volatile computer memories (referred to collectively as computer-readable memories below). Computer-readable memories are for example volatile memories such as caches, buffers or RAM and also nonvolatile memories such as removable data carriers, hard disks, etc.

The functions or steps described hereinabove may be present in the form of at least one instruction set in/on a computer-readable memory. The functions or steps are not tied to a specific instruction set or to a specific form of instruction sets or to a specific storage medium or to a specific processor or to specific execution schemes and may be executed alone or in any desired combination by means of software, firmware, microcode, hardware, processors, integrated circuits etc. A wide variety of processing strategies may be used, for example serial processing by a single processor or multiprocessing or multitasking or parallel processing, etc.

The instructions may be stored in local memories, but it is also possible to store the instructions on a remote system and to access them via a network.

The transmission device may have one or more processors. The term "processor", "central signal processing", "control unit" or "data evaluation means" covers processing means in the broadest sense, that is to say, for example, servers, universal processors, graphics processors, digital signal processors, application-specific integrated circuits (ASICs), programmable logic circuits such as FPGAs, discrete analog or digital circuits and any desired combinations thereof, including all other processing means that are known to a person skilled in the art or will be developed in future. In this case, processors may consist of one or more devices, or apparatuses, or units. If a processor consists of multiple devices, they may be designed, or configured, for the parallel or sequential processing, or execution, of instructions.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for securely starting up a container instance in one or more execution environments for one or more components of a technical installation, such an execution environment being designed to execute the container instance, the method comprising:
   a) providing a configurable check function that is performed before and/or while starting up the container instance;

b) logging each step for preparing at least one execution limitation required for starting up and/or executing the container instance;
c) checking each logged step using at least one permissibility criterion configured in the check function, wherein the at least one permissibility criterion is a rights signature to be fulfilled; and
d) completing a startup and if necessary the execution of the container instance, in response to the at least one permissibility criterion being satisfied, or
e) initiating an alerting measure or a measure that counteracts the startup in response to at the least one permissibility criteria not being satisfied.

2. The method as claimed in claim 1, wherein steps c) to e) are repeated as required, on an event-controlled basis and/or on a time-controlled basis while executing the container instance.

3. The method as claimed in claim 1, wherein a respective hash value is determined and logged for each execution limitation.

4. The method as claimed in claim 1, wherein all the determined hash values are combined with one another in each such step to form a total value, and a total value and a change therein that arises with each step are logged.

5. The method as claimed in claim 4, wherein the total value is representable or is represented by a fingerprint.

6. The method as claimed in claim 4, wherein the total value is compared with the corresponding configured permissibility criterion.

7. The method as claimed in claim 1, wherein besides the at least one execution limitation one or more environment parameters of the execution environment are also logged and are concurrently taken into consideration when forming a total value.

8. A device for securely starting up a container instance in one or more execution environments for one or more components of a technical installation, such an execution environment being designed to execute the container instance, the device comprising:
a processor coupled to a memory, the processor configured to:
a) provide a configurable check function before and/or while starting up the container instance;
b) log each step for preparing at least one execution limitation required for starting up and/or executing the container instance;
c) compare each logged step with a permissibility criterion configured in the check function, wherein the permissibility criterion is a rights signature to be fulfilled; and
d) complete a startup and if necessary the execution of the container instance, in response to the permissibility criterion being satisfied, or
e) initiate an alerting measure and/or a measure that counteracts the startup, in response to the possible permissibility criteria not being satisfied.

9. The device as claimed in claim 8, wherein the memory is internally integrated or an externally linked to the processor of the device.

10. A computer program product, comprising a computer readable hardware storage device having computer readable program code stored therein, said program code executable by a processor of a computer system to implement a method as claimed in claim 1.

* * * * *